(12) United States Patent  (10) Patent No.: US 8,830,537 B2
Tsuda  (45) Date of Patent: Sep. 9, 2014

(54) DATA COMMUNICATION APPARATUS, DATA COMMUNICATION METHOD, AND COMPUTER-READABLE RECORDING MEDIUM STORING DATA COMMUNICATION PROGRAM

(75) Inventor: Hiromi Tsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1090 days.

(21) Appl. No.: 12/179,983

(22) Filed: Jul. 25, 2008

(65) Prior Publication Data

US 2009/0046329 A1  Feb. 19, 2009

(30) Foreign Application Priority Data

Aug. 13, 2007 (JP) .................... 2007-211080

(51) Int. Cl.
*H04N 1/04* (2006.01)
*H04N 1/40* (2006.01)
*H04N 1/32* (2006.01)

(52) U.S. Cl.
CPC .... *H04N 1/32037* (2013.01); *H04N 2201/0093* (2013.01); *H04N 1/32096* (2013.01)
USPC .......................................... 358/474; 358/471

(58) Field of Classification Search
None
See application file for complete search history.

(56) References Cited

U.S. PATENT DOCUMENTS

| 4,945,216 A | * | 7/1990 | Tanabe et al. ............. 235/462.15 |
| 5,671,374 A | * | 9/1997 | Postman et al. ............. 710/305 |
| 6,829,600 B2 | * | 12/2004 | Gu et al. ....................... 707/809 |
| 7,515,315 B2 | * | 4/2009 | Ferlitsch ...................... 358/474 |
| 7,562,820 B2 | * | 7/2009 | Muramatsu .................. 235/400 |
| 8,294,549 B2 | * | 10/2012 | Samovar et al. .............. 340/5.2 |
| 2001/0054008 A1 | * | 12/2001 | Miller et al. .................... 705/26 |
| 2002/0023959 A1 | * | 2/2002 | Miller et al. ............. 235/462.13 |
| 2003/0217103 A1 | * | 11/2003 | Yamamoto et al. .......... 709/203 |
| 2004/0199519 A1 | * | 10/2004 | Gu et al. ....................... 707/100 |
| 2006/0017941 A1 | * | 1/2006 | Momozono et al. .......... 358/1.1 |
| 2006/0113390 A1 | * | 6/2006 | Muramatsu .............. 235/462.27 |
| 2007/0276944 A1 | * | 11/2007 | Samovar et al. ............. 709/225 |
| 2010/0172680 A1 | * | 7/2010 | Butcher ......................... 400/76 |

FOREIGN PATENT DOCUMENTS

| JP | 2007-60284 | 3/2007 |
| JP | 2007-67661 | 3/2007 |

* cited by examiner

*Primary Examiner* — Marcus T Riley
(74) *Attorney, Agent, or Firm* — Oblon, Spivak, McClelland, Maier & Neustadt, L.L.P.

(57) ABSTRACT

A data communication apparatus is disclosed. In the data communication apparatus, when plural documents including destination information are transmitted to an external apparatus by using a facsimile function, reference destination information in image data of a reference document is compared with destination information in image data of documents other than the reference document. When the destination information in the image data of the documents other than the reference document is the same as the reference destination information in the image data of the reference document, the image data of the plural documents are transmitted to the external apparatus.

15 Claims, 12 Drawing Sheets

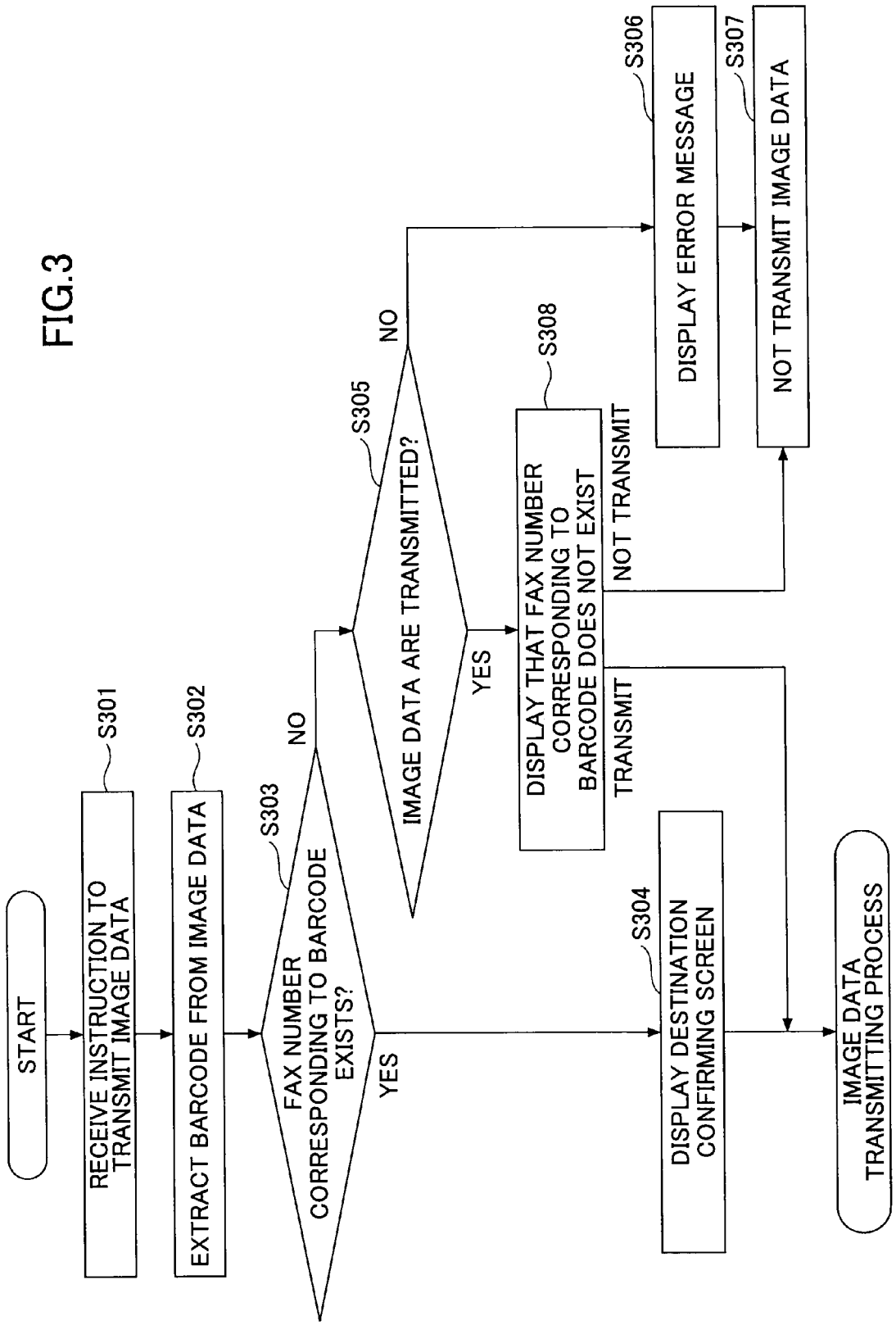

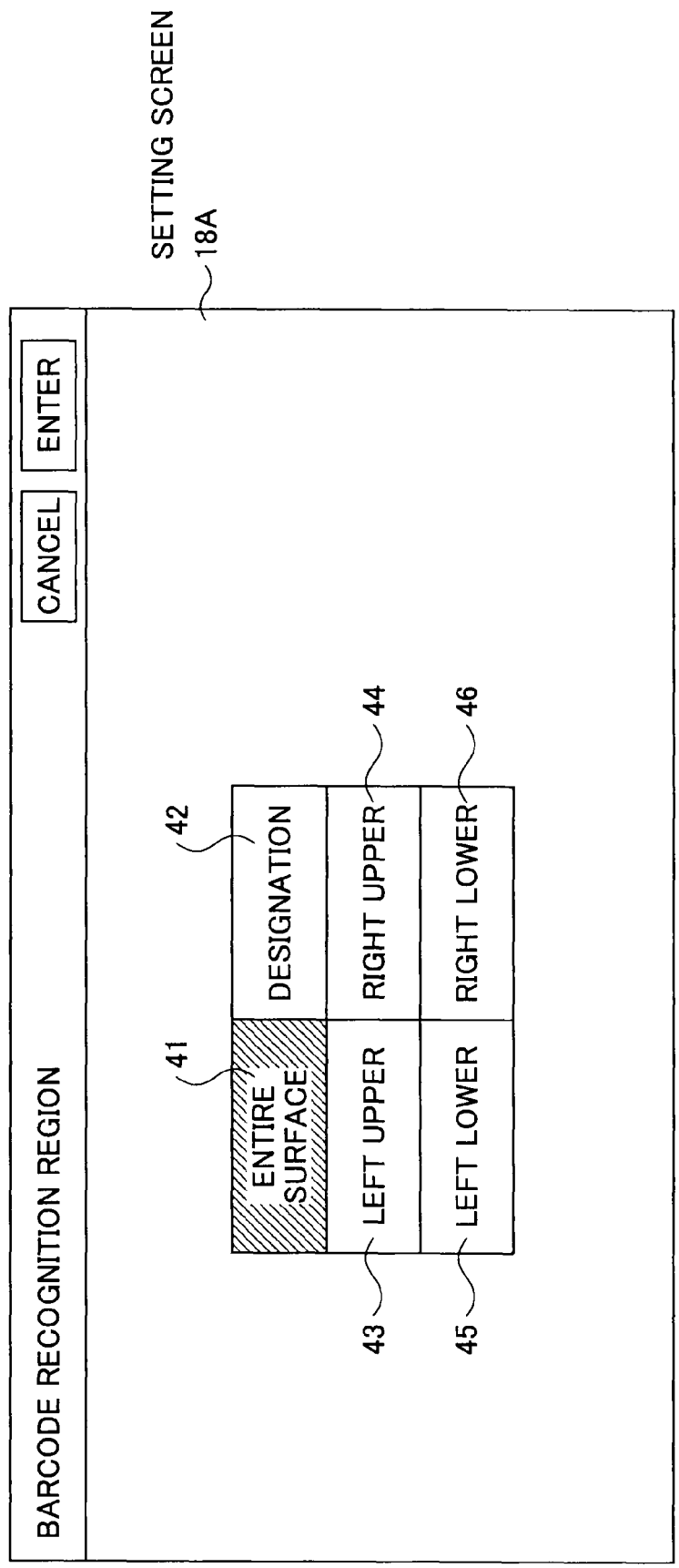

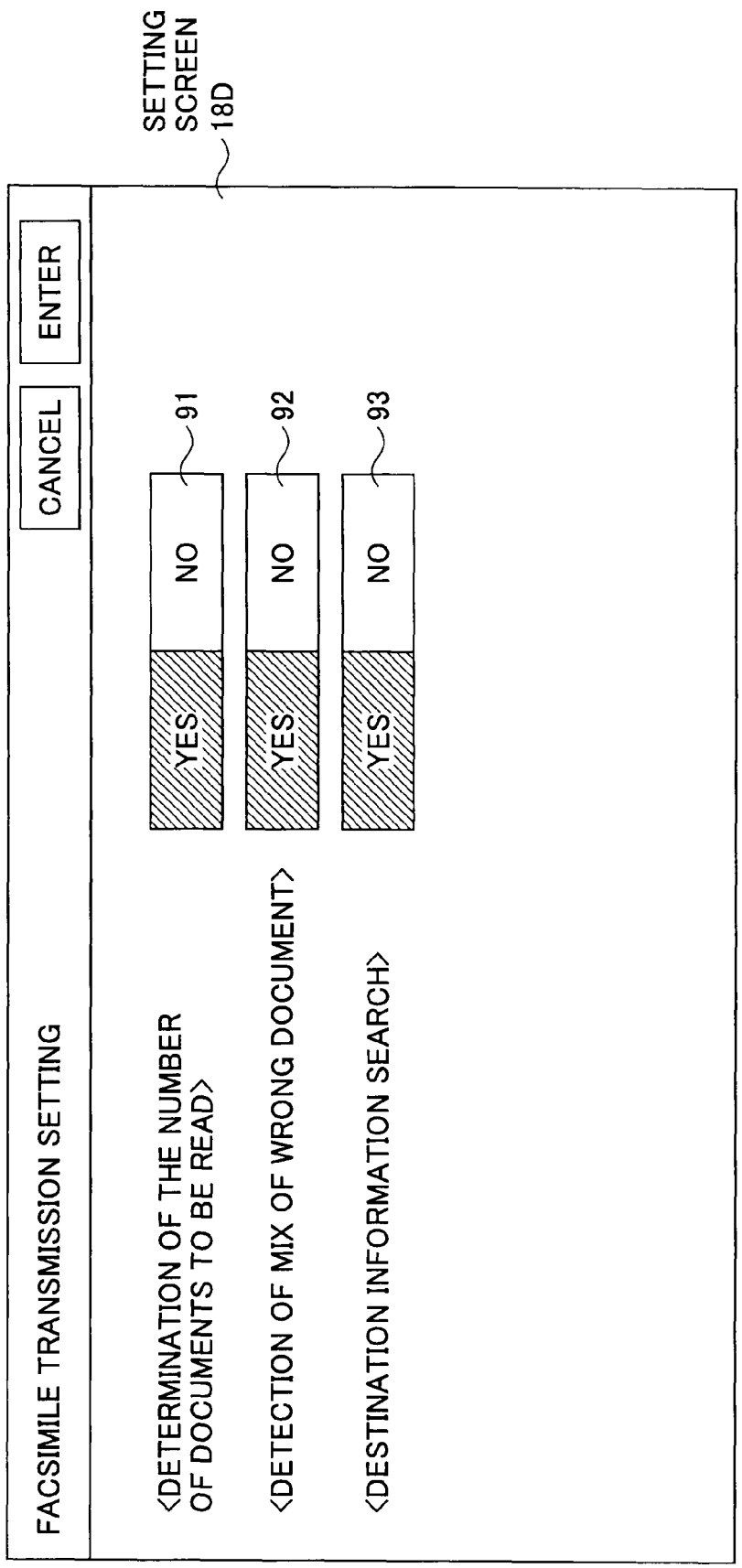

DATA COMMUNICATION APPARATUS, DATA COMMUNICATION METHOD, AND COMPUTER-READABLE RECORDING MEDIUM STORING DATA COMMUNICATION PROGRAM

BACKGROUND OF THE INVENTION

1. Field of the Invention

The present invention generally relates to a data communication apparatus, a data communication method, and a computer-readable recording medium storing a data communication program in which image data are communicated.

2. Description of the Related Art

In a data communication apparatus which transmits image data by using a facsimile function, in order to prevent wrong transmission of the image data, many countermeasures by personal operations are provided. For example, a facsimile transmitting procedure is determined, or the destination of the facsimile transmission is checked by plural persons. However, these measures give a great burden to the persons and the procedure is complex.

Patent Document 1 discloses a facsimile apparatus. The facsimile apparatus provides a function in which a destination of image data is automatically designated.

[Patent Document 1] Japanese Laid-Open Patent Application No. 2007-60284

However, in Patent Document 1, for example, when a wrong document is mixed into plural documents, or a document is lost from the documents to be transmitted, the above problems cannot be detected. Consequently, image data of the wrong document or image data whose part is lost are transmitted.

SUMMARY OF THE INVENTION

In a preferred embodiment of the present invention, there is provided a data communication apparatus, a data communication method, and a computer-readable recording medium storing a data communication program in which wrong transmission of image data can be surely prevented.

Features and advantages of the present invention are set forth in the description that follows, and in part will become apparent from the description and the accompanying drawings, or may be learned by practice of the invention according to the teachings provided in the description. Features and advantages of the present invention will be realized and attained by a data communication apparatus, a data communication method, and a computer-readable recording medium storing a data communication program particularly pointed out in the specification in such full, clear, concise, and exact terms so as to enable a person having ordinary skill in the art to practice the invention.

To achieve one or more of these and other advantages, according to one aspect of the present invention, there is provided a data communication apparatus. The data communication apparatus includes a scanning unit which forms image data by scanning plural documents including destination information, a destination extracting unit which extracts the destination information from the image data, a destination determining unit which determines whether reference destination information extracted from the image data of a reference document in the plural documents is the same as the destination information extracted from the image data of the plural documents other than the reference document, and a transmission control unit which controls transmission of the image data based on the determined result by the destination determining unit.

According to another aspect of the present invention, there is provided a data communication method in a data communication apparatus. The data communication method includes a scanning step which forms image data by scanning plural documents including destination information, a destination extracting step which extracts the destination information from the image data, a destination determining step which determines whether reference destination information extracted from the image data of a reference document in the plural documents is the same as the destination information extracted from the image data of the plural documents other than the reference document, and a transmission control step which controls transmission of the image data based on the determined result by the destination determining step.

According to another aspect of the present invention, there is provided a computer-readable recording medium storing a data communication program in a data communication apparatus. The data communication program includes a scanning step which forms image data by scanning plural documents including destination information, a destination extracting step which extracts the destination information from the image data, a destination determining step which determines whether reference destination information extracted from the image data of a reference document in the plural documents is the same as the destination information extracted from the image data of the plural documents other than the reference document, and a transmission control step which controls transmission of the image data based on the determined result by the destination determining step.

Effect of the Invention

According to an embodiment of the present invention, a data communication apparatus includes a scanning unit which forms image data by scanning plural documents including destination information, a destination extracting unit which extracts the destination information from the image data, a destination determining unit which determines whether reference destination information extracted from the image data of a reference document in the plural documents is the same as the destination information extracted from the image data of the plural documents other than the reference document, and a transmission control unit which controls transmission of the image data based on the determined result by the destination determining unit. Therefore, wrong transmission of the image data can be surely prevented.

BRIEF DESCRIPTION OF THE DRAWINGS

Features and advantages of the present invention will become more apparent from the following detailed description when read in conjunction with the accompanying drawings, in which:

FIG. 3 is a flowchart showing a barcode extracting process and a destination information searching process by the data communication apparatus shown in FIG. 2;

FIG. 4A is a diagram showing a setting screen of a barcode recognition region displayed on an operating panel shown in FIG. 1;

FIG. 10 is a diagram showing an example of a setting screen on the operating panel when a facsimile transmission setting is executed according to the second embodiment of the present invention.

DESCRIPTION OF THE PREFERRED EMBODIMENTS

Best Mode of Carrying Out the Invention

The best mode of carrying out the present invention is described with reference to the accompanying drawings.

In a data communication apparatus according to an embodiment of the present invention, when plural documents having destination information are transmitted by using a facsimile function, reference destination information in image data of a reference document of the plural documents is compared with destination information in image data of the plural documents other than the reference document. When the destination information in the image data of the plural documents other than the reference document is equal to the reference destination information, the plural documents are transmitted. To the contrary, when the destination information in the image data of the plural documents other than the reference document is not equal to the reference destination information, the plural documents are not transmitted.

First Embodiment

First, a data communication apparatus 100 according to a first embodiment of the present invention is described.

Figure 1:
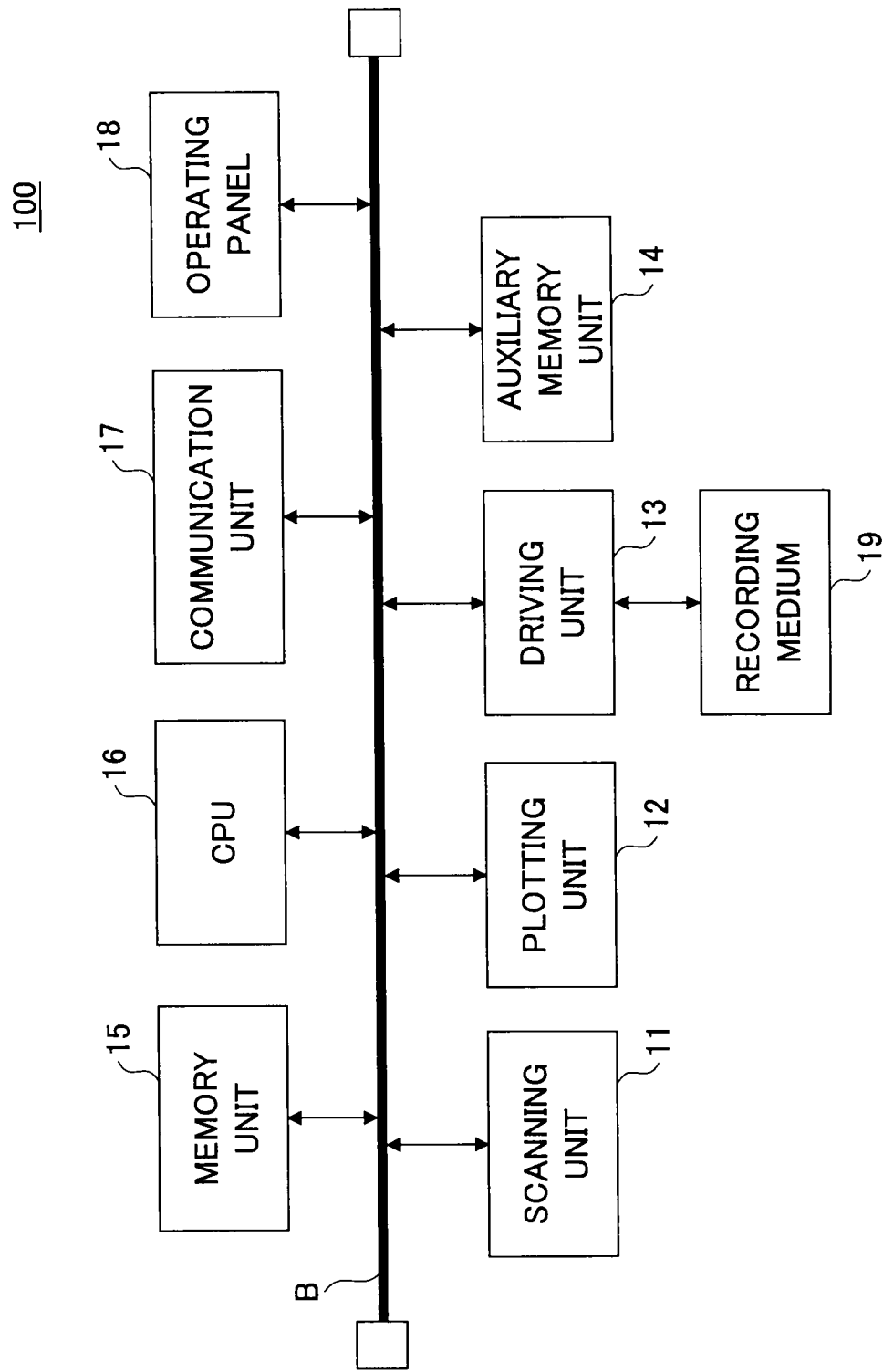
FIG. 1 is a hardware structure of a data communication apparatus according to a first embodiment of the present invention.

FIG. 1 is a hardware structure of the data communication apparatus 100 according to the first embodiment of the present invention.

As shown in FIG. 1, the data communication apparatus 100 includes a scanning unit 11, a plotting unit 12, a driving unit 13, an auxiliary memory unit 14, a memory unit 15, a CPU (central processing unit) 16, a communication unit 17, and an operating panel 18. The above elements are connected to each other via a bus B. In addition, a recording medium 19 is attached to the driving unit 13, and the driving unit 13 drives the recording medium 19. Image data from the data communication apparatus 100 are transmitted to an external apparatus (not shown) via the communication unit 17.

The scanning unit 11 includes a scanner engine (not shown) and an engine controlling section (not shown), and forms image data by scanning a document. The plotting unit 12 includes a plotter engine (not shown) and an engine controlling section (not shown), and outputs image data on recording media, for example, recording paper. The communication unit 17 includes a modem and a LAN card; and is connected to the external apparatus via a network. The operating panel 18 is used for operating the data communication apparatus 100 and includes, for example, a touch panel having a displaying function.

The data communication program is one of the programs which control the data communication apparatus 100. The data communication program is obtained from the recording medium 19 via the driving unit 13, or is obtained by being downloaded from an external apparatus connected to the network via the communication unit 17.

As the recording medium 19 where the data communication program is stored, recording media which optically, magnetically, or electrically record information such as a CD-ROM, a flexible disk, an optical disk, and a magneto-optical disk can be used. In addition, as the recording medium 19, semiconductor memory units which electrically record information such as a ROM and a flash memory unit can be used.

When the recording medium 19 where the data communication program is stored is driven by the driving unit 13, the data communication program is installed in the auxiliary memory unit 14 via the driving unit 13. When the data communication program is downloaded from the external apparatus in the network via the communication unit 17, the data communication program is installed in the auxiliary memory unit 14.

The auxiliary memory unit 14 also stores files, data, and so on which are necessary for operations of the data communication apparatus 100. The memory unit 15 stores the data communication program by reading from the auxiliary memory unit 14 when the data communication apparatus 100 is started up. The CPU 16 controls all the elements in the data communication apparatus 100, and controls processes by the data communication apparatus 100.

As described above, the data communication apparatus 100 includes the scanning function of image data by the scanning unit 11, the plotting function of image data by the plotting unit 12, and the facsimile function via the communication unit 17. In the following, the scanning function of the image data and the facsimile function of the image data are mainly described.

Figure 2:
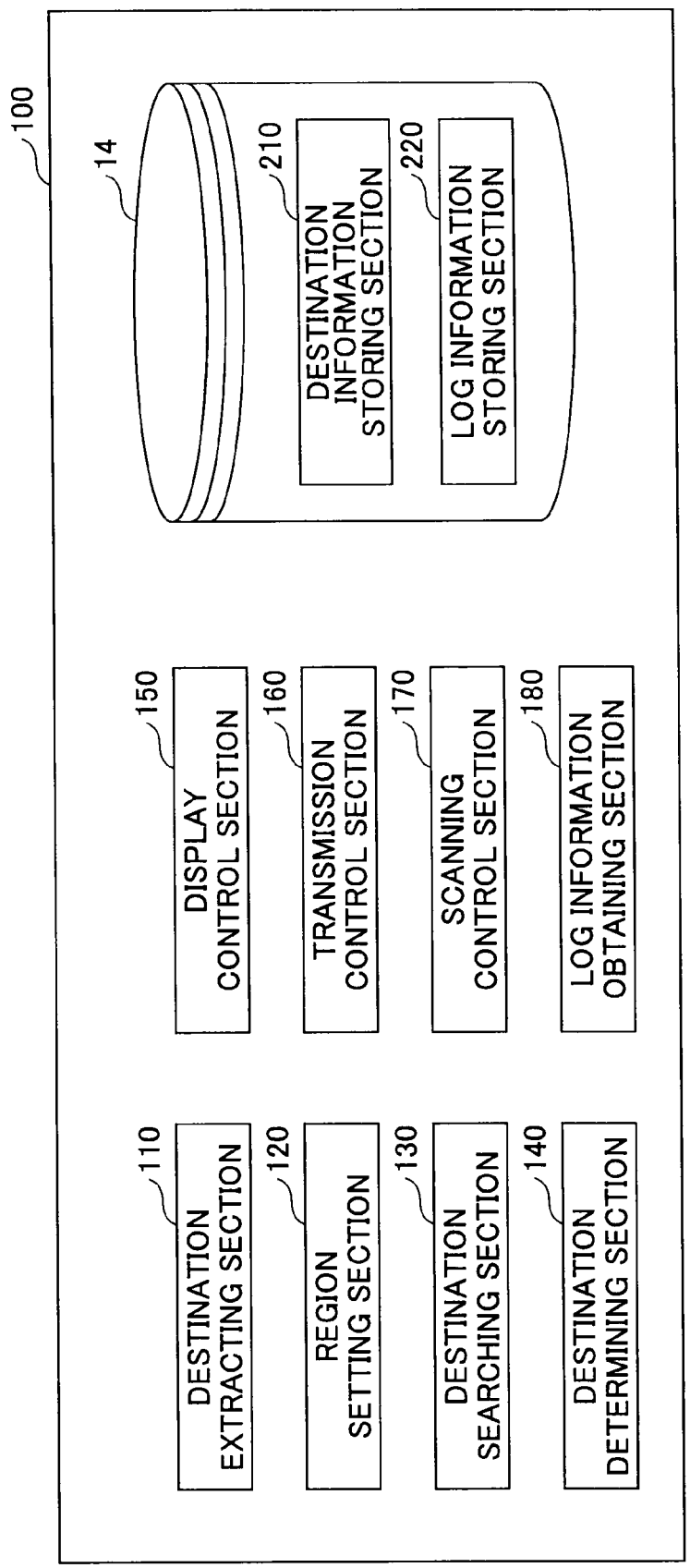
FIG. 2 is a functional structure of the data communication apparatus according to the first embodiment of the present invention.

FIG. 2 is a functional structure of the data communication apparatus 100 according to the first embodiment of the present invention.

As shown in FIG. 2, the data communication apparatus 100 includes a destination extracting section 110 (destination extracting unit), a region setting section 120 (region setting unit), a destination searching section 130 (destination searching unit), a destination determining section 140 (destination determining unit), a display control section 150 (display control unit), a transmission control section 160 (transmission control unit), a scanning control section 170 (scanning control unit), a log information obtaining section 180 (log information obtaining unit), and the auxiliary memory unit 14. The auxiliary memory unit 14 includes a destination information storing section 210 (destination information storing unit) where destination information is stored and a log information storing section 220 where log information is stored.

In the data communication apparatus 100, when image data are transmitted from the data communication apparatus 100 to an external apparatus (not shown) via the communication unit 17 by using a facsimile function, the destination extracting section 110 extracts reference destination information in a reference document. When the destination determining section 140 determines that the reference destination information is the same as destination information in plural documents other than the reference document, the transmission control section 160 transmits the image data to the destination of the destination information determined by the destination determining section 140.

Next, referring to FIGS. 1 and 2, the functional elements in the data communication apparatus 100 are described in detail.

The destination extracting section 110 extracts destination information from image data of a document. In the present embodiment, a barcode showing the destination information of the image data of the document to be transmitted has been printed on the document beforehand. The destination information is, for example, a Fax number of the destination. The destination extracting section 110 extracts the barcode from image data scanned by the scanning unit 11, and causes the barcode to be the destination information.

The destination extracting section 110 recognizes the position of the barcode from the image data. In the present embodiment, the destination extracting section 110 recognizes an image having a specific pattern as the barcode from the image data by using an algorithm. The recognized barcode is converted into a Fax number by another algorithm. The algorithms have been stored in the auxiliary memory unit 14 beforehand. The destination extracting section 110 recognizes the specific pattern as the barcode and converts the barcode into the Fax number by using the algorithms stored in the auxiliary memory unit 14.

The region setting section 120 sets a region of the image data from which the barcode is extracted. The region setting section 120 is described below in detail.

The destination searching section 130 searches for a Fax number in the destination information storing section 210 which Fax number is the same as the Fax number converted from the barcode. In the destination information storing section 210, a table (for example, an address book) can be stored. In the table, Fax numbers and corresponding additional information relating to the Fax numbers are stored. The additional information is, for example, the name of the destination, the type of the telephone line, and the place of the destination (domestic or overseas place). The additional information is displayed on the operating panel 18 by the display control section 150 at a predetermined timing. The display control section 150 is described below in detail.

The destination determining section 140 determines whether the reference destination information of the image data in the reference document is equal to the destination information of the image data in a document other than the reference document. Specifically, the destination determining section 140 determines whether a tone value obtained from the barcode printed on the reference document is equal to a tone value obtained from the barcode printed on the document other than the reference document.

The display control section 150 controls a display on the operating panel 18.

The transmission control section 160 controls the transmission of image data based on the determined result by the destination determining section 140. Specifically, when the destination determining section 140 determines that the reference destination information in the reference document is equal to the destination information in the document other than the reference document, the transmission control section 160 transmits the image data of both the documents to the destination. To the contrary, when the destination determining section 140 determines that the reference destination information in the reference document is not equal to the destination information in the document other than the reference document, the transmission control section 160 does not transmit the image data.

The scanning control section 170 controls operations (for example, a scanning start operation and a scanning stop operation) of the scanning unit 11. The log information obtaining section 180 obtains the process history (log information) of the data communication apparatus 100 and stores the log information in the log information storing section 220 of the auxiliary memory unit 14.

As described above, the information of the destinations to which image data are transmitted has been stored in the destination information storing section 210 beforehand. As described above, the log information is stored in the log information storing section 220. The log information is, for example, a user name used the data communication apparatus 100, destination information of transmitted image data, transmitted image data, and an image data transmitted date.

Next, referring to FIG. 3, processes by the data communication apparatus 100 are described.

FIG. 3 is a flowchart showing a barcode extracting process and a destination information searching process by the data communication apparatus 100.

First, the data communication apparatus 100 receives an instruction from a user to transmit image data by using a facsimile function to a destination (S301). The scanning unit 11 obtains image data by reading (scanning) a first document in plural documents to be transmitted. Hereinafter the image data of the first document are referred to as image data 1. The destination extracting section 110 extracts a barcode from the image data 1 as the destination information (S302). In the present embodiment, the first document in the plural documents is defined as a reference document and destination information in the reference document is defined as reference destination information. Therefore, the barcode extracted from the image data 1 is the reference destination information.

When the image data 1 do not have a barcode and the barcode is not extracted from the image data 1 in S302, the display control section 150 causes the operating panel 18 to display an error message that the first document does not include the destination information.

The destination searching section 130 searches for a Fax number corresponding to the barcode extracted from the image data 1 in the destination information storing section 210 (S303). That is, the destination searching section 130 searches for whether a Fax number corresponding to the barcode extracted from the image data 1 exists in the destination information storing section 210.

When a Fax number corresponding to the barcode extracted from the image data 1 exists in the destination information storing section 210 (YES in S303), the display control section 150 causes the operating panel 18 to display a destination confirming screen including the Fax number (S304). At this time, the display control section 150 obtains the additional information related to the Fax number from the destination information storing section 210 and causes the operating panel 18 to display the additional information together with the Fax number on the destination confirming screen. When the user confirms the destination information including the Fax number on the destination confirming screen, the data communication apparatus 100 executes an image data transmitting process.

When a Fax number corresponding to the barcode extracted from the image data 1 does not exist in the destination information storing section 210 (NO in S303), it is determined whether the data communication apparatus 100 has been set so that the image data are transmitted even if a Fax number corresponding to the barcode extracted from the image data 1 does not exist in the destination information storing section 210 (S305). In a case where the data communication apparatus 100 has been set so that the image data are not transmitted when a Fax number corresponding to the barcode extracted from the image data 1 does not exist in the destination information storing section 210 (NO in S305), the display control section 150 causes the operating panel 18 to display an error message that the Fax number corresponding to the barcode extracted from the image data 1 does not exist (S306). Then the transmission control section 160 does not transmit the image data. That is, the data communication apparatus 100 discards a facsimile transmission job.

In a case where the data communication apparatus 100 has been set so that the image data are transmitted even if a Fax number corresponding to the barcode extracted from the image data 1 does not exist in the destination information storing section 210 (YES in S305), the display control section 150 causes the operating panel 18 to display that the Fax number corresponding to the barcode extracted from the image data 1 does not exist (S308). When the user recognizes that the Fax number corresponding to the barcode extracted from the image data 1 does not exist on the displaying panel 18 and instructs transmitting the image data, the data communication apparatus 100 executes the image data transmitting process. However, when the user recognizes that the Fax number corresponding to the barcode extracted from the image data 1 does not exist on the displaying panel 18 and does not instruct transmitting the image data, the transmission control section 160 does not transmit the image data (S307).

In the above, the barcode is extracted from only the image data 1. However, when image data of plural documents are transmitted, the barcodes of the image data of the plural documents are extracted by the destination extracting section 110. This process is described below in detail.

In the description shown in FIG. 3, the barcode is extracted from the image data 1 by scanning the entire surface of the first document. However, the barcode can be extracted from a region of the image data which region is set by the region setting section 120.

Next, referring to the drawings, region settings by the region setting section 120 is described.

FIG. 4A is a diagram showing a setting screen 18A of a barcode recognition region displayed on the operating panel 18. The barcode is recognized in the barcode recognition region. The destination extracting section 110 can extract a barcode only in a region set in the barcode recognition region. In the setting screen 18A shown in FIG. 4A, setting buttons 41 through 46 are displayed. When a user selects one of the buttons 41 through 46, a barcode recognition region is set. That is, the region setting section 120 sets the barcode recognition region by using one of the setting buttons 41 through 46.

For example, when the barcode recognition region is set by the setting button 41, the destination extracting section 110 extracts the barcode from the image data obtained from the entire surface of the document. When the barcode recognition region is set by the setting button 42, the destination extracting section 110 extracts the barcode from the image data obtained from a designated region of the document. The designated region is described below. In addition, when the barcode recognition region is set by the corresponding setting buttons 43 through 46, the destination extracting section 110 extracts the barcode from the image data obtained at the corresponding set regions.

Figure 4B:
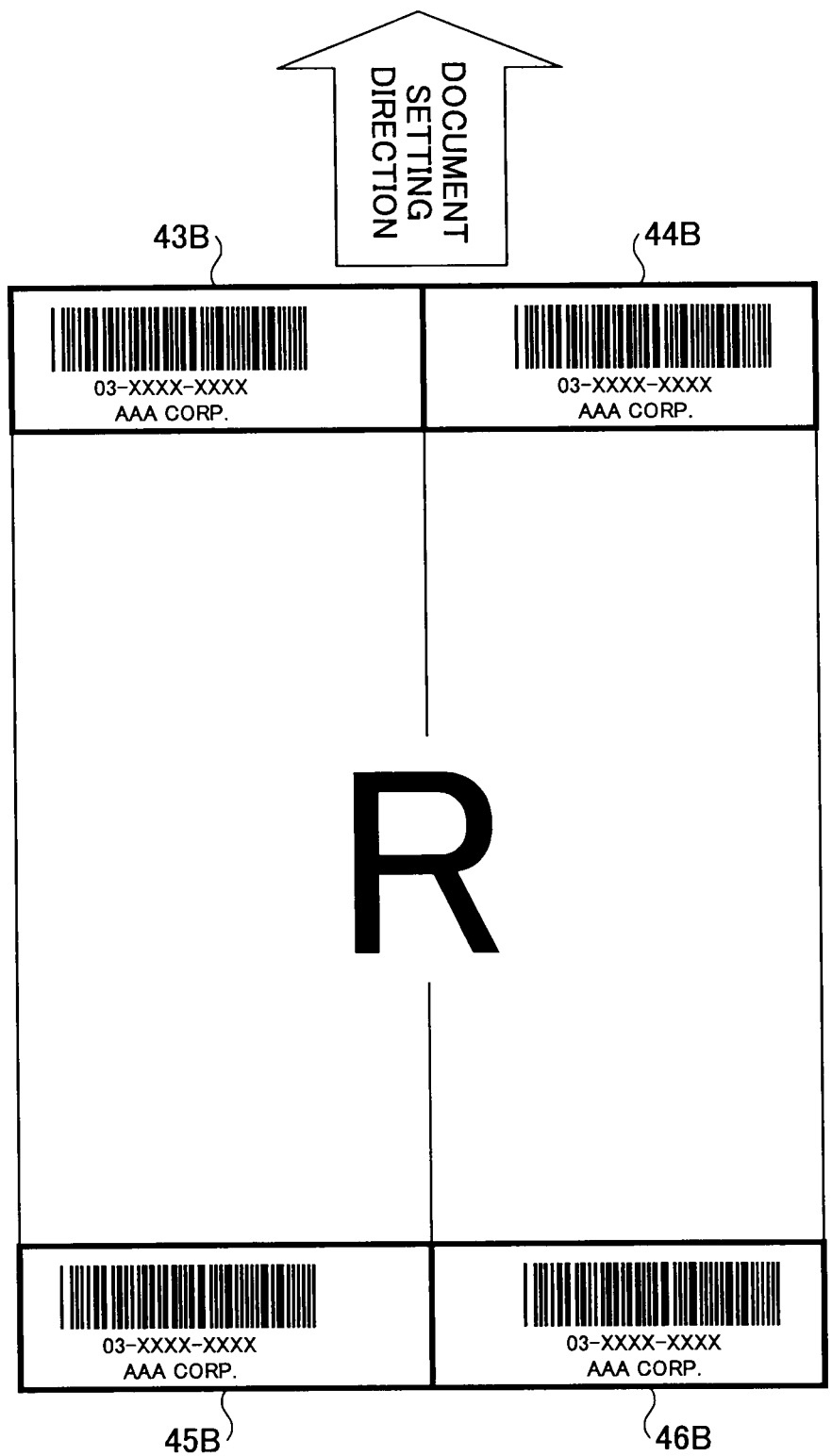
FIG. 4B is a diagram showing the barcode recognition regions in a document set by setting buttons shown in FIG. 4A.

FIG. 4B is a diagram showing the barcode recognition regions in a document (image data) set by the setting buttons 43 through 46. When the barcode recognition region is set as "LEFT UPPER" on the setting screen 18A shown in FIG. 4A by the setting button 43, the region setting section 120 sets an image data region 43B as the barcode recognition region. When the barcode recognition region is set as "RIGHT UPPER" on the setting screen 18A shown in FIG. 4A by the setting button 44, the region setting section 120 sets an image data region 44B as the barcode recognition region. When the barcode recognition region is set as "LEFT LOWER" on the setting screen 18A shown in FIG. 4A by the setting button 45, the region setting section 120 sets an image data region 45B as the barcode recognition region. In addition, when the barcode recognition region is set as "RIGHT LOWER" on the setting screen 18A shown in FIG. 4A by the setting button 46, the region setting section 120 sets an image data region 46B as the barcode recognition region. The destination extracting section 110 extracts a barcode from image data in the set barcode recognition region.

Next, a case is described in which the barcode recognition region is set by the setting button 42 "DESIGNATION" on the setting screen shown in FIG. 4A. When the barcode recognition region is set by the setting button 42, the barcode recognition region can be arbitrarily set.

Figure 5A:
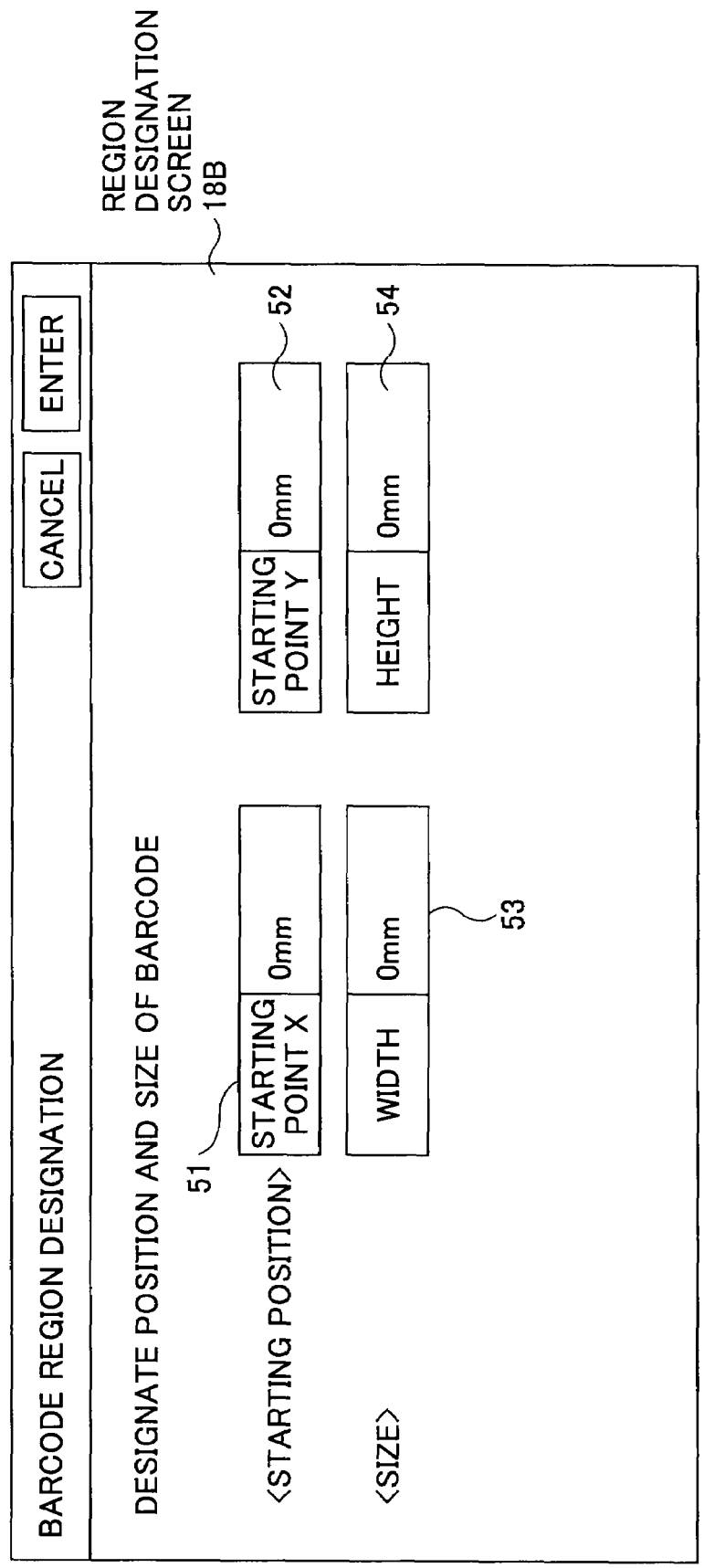
FIG. 5A is diagram showing a region designation screen in a barcode region designation displayed on the operating panel shown in FIG. 1.

FIG. 5A is diagram showing a region designation screen 18B in a barcode region designation displayed on the operating panel 18.

When the setting button 42 "DESIGNATION" is set on the setting screen 18A shown in FIG. 4A, the display control section 150 causes the operating panel 18 to display the region designation screen 18B. Then an arbitrarily barcode recognition region can be set on the region designation screen 18B.

Figure 5B:
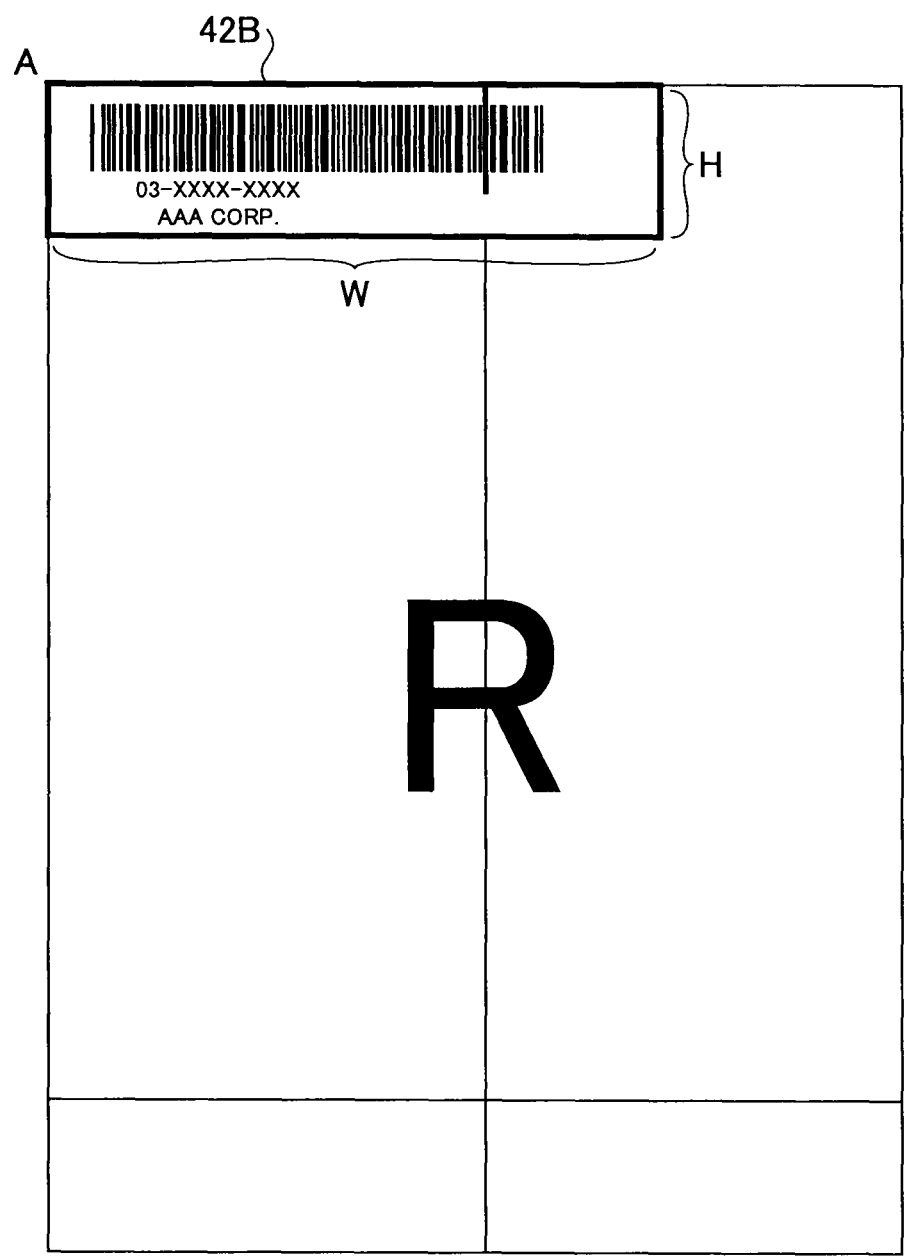
FIG. 5B is a diagram showing a barcode recognition region in a document set on the region designation screen shown in FIG. 5A.

FIG. 5B is a diagram showing a barcode recognition region in a document (image data) set on the region designation screen 18B shown in FIG. 5A. When the barcode recognition region is set as "DESIGNATION" on the setting screen 18A shown in FIG. 4A by the setting button 42, as shown in FIG. 5A, the region designation screen 18B is displayed on the operating panel 18.

In FIG. 5A, on the region designation screen 18B, columns 51 through 54 are displayed. By the columns 51 and 52, a starting position of a barcode recognition region in image data (document) is designated. That is, a point A in coordinates shown in FIG. 5B is designated. In addition, a width W of the barcode recognition region shown in FIG. 5B is designated by the column 53, and a height H of the barcode recognition region shown in FIG. 5B is designated by the column 54. Consequently, the region setting section 120 sets an image data region 42B as the barcode recognition region.

As described above, in the present embodiment, a barcode can be extracted from image data in a set barcode recognition region. Therefore, even if plural barcodes are printed on a document, a barcode showing a destination can be extracted by designating the barcode recognition region.

Figure 6:
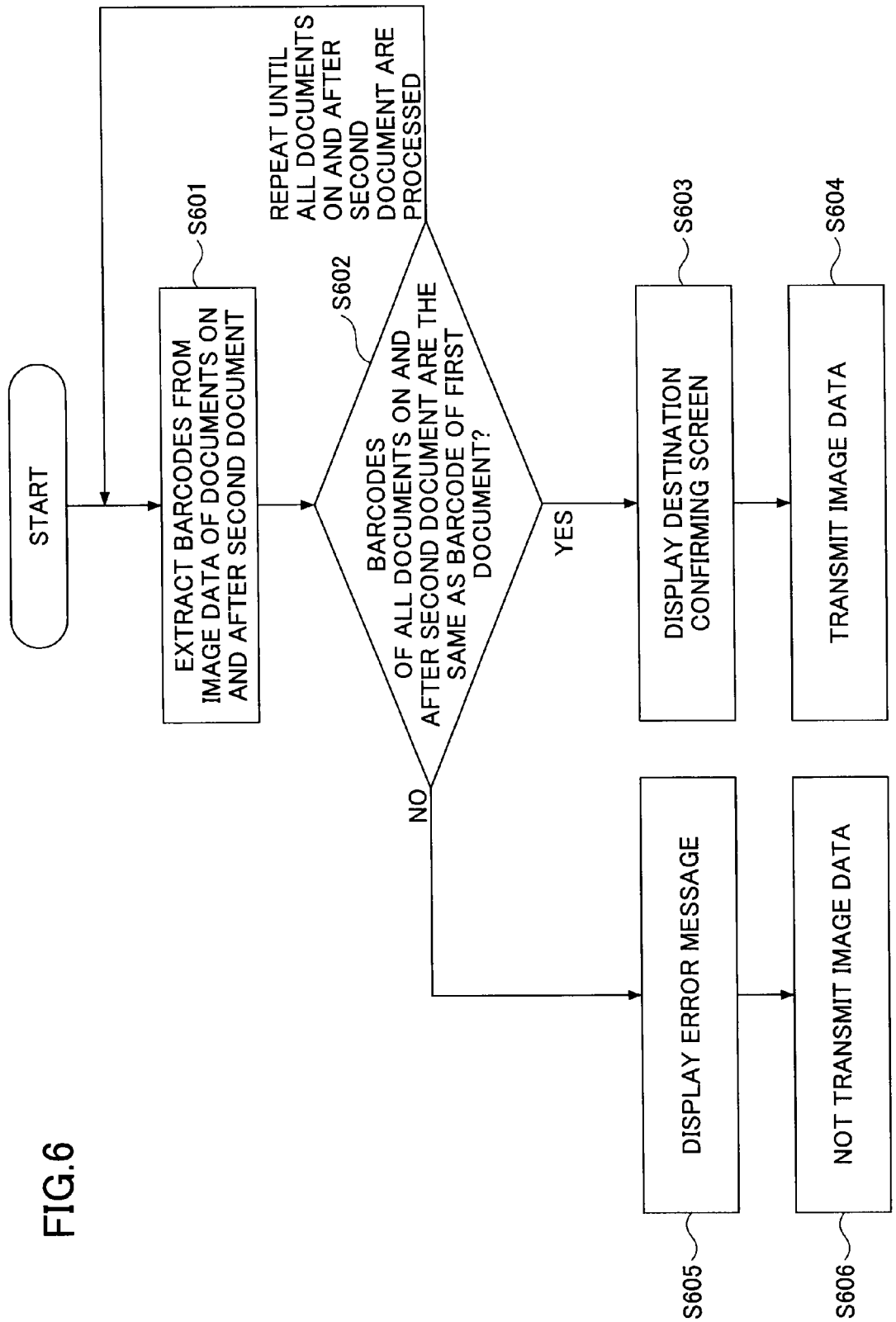
FIG. 6 is a flowchart showing a destination determining process by the data communication apparatus shown in FIG. 2.

FIG. 6 is a flowchart showing a destination determining process by the data communication apparatus 100.

Referring to FIG. 6, the destination determining process by the data communication apparatus 100 is described. In this, the barcode of the first document has been extracted.

First, the scanning unit 11 reads (scans) image data of a second document in plural documents to be transmitted. Hereinafter the image data of the second document is referred to as image data 2. The destination extracting section 110 extracts a barcode from the image data 2 (S601). In the present embodiment, as described above, the first document in the plural documents is defined as the reference document and destination information in the reference document is defined as reference destination information. Therefore, the documents on and after the second document are not the reference document.

The destination determining section 140 compares the barcode extracted from the image data 1 with the barcode of the image data 2, and determines whether the barcodes are the same (S602). In this, the processes in S601 and S602 are repeated until all plural documents on and after the second document are processed.

That is, in S601, the destination extracting section 110 extracts barcodes from the image data of the documents on and after the second document. In addition, in S602, the destination determining section 140 compares the barcode extracted from the image data 1 with the barcodes from the image data of the documents on and after the second document, and determines whether all the barcodes are the same. For example, when the number of the documents is five, the barcodes in the second through fifth documents are sequentially compared with the barcode of the first document (reference document).

When the barcodes of all the documents on and after the second document are the same as the barcode of the first document (YES in S602), the display control section 150 causes the operating panel 18 to display a destination confirming screen (S603). When the user confirms the screen and instructs transmitting the image data of the plural documents, the transmission control section 160 transmits the image data of the plural documents to the destination by using the facsimile function (S604).

When the barcodes of all the documents on and after the second document are not absolutely the same as the barcode of the first document (NO in S602), the display control section 150 causes the operating panel 18 to display an error message that a wrong document is mixed into the plural documents (S605), and the transmission control section 160 does not transmit the image data (S606). That is, the data communication apparatus 100 discards the facsimile transmission job.

In the present embodiment, when the barcode extracted from image data of a document on and after the second document (image data 2) is not the same as the barcode of the first document (image data 1) in S602, the scanning control section 170 can stop scanning image data by the scanning unit 11. For example, when the destination determining section 140 determines that a barcode extracted from image data of a third document is not the same as the barcode extracted from the image data 1, the scanning control section 170 stops scanning image data of a fourth document by the scanning unit 11.

As described above, in the present embodiment, when a document whose destination is different from a reference destination is mixed into documents having the reference destination, the image data transmitting process can be stopped.

As described above, in the present embodiment, a barcode printed on a document is extracted as destination information, and image data of the document are transmitted to a destination of the destination information. Therefore, the image data of the document can be prevented from being transmitted to a wrong destination. In addition, when plural documents are transmitted, a document whose destination is different from the reference destination can be prevented from being transmitted; consequently, wrong transmission of image data can be accurately prevented.

In the present embodiment, the destination searching section 130 searches for destination information in the destination information storing section 210, and the destination determining section 140 determines the destination by using the searched for and located destination information. However, the destination determining section 140 can determine the destination by not executing a process in the destination searching section 130. In this case, the destination determining section 140 determine the destination from the destination information extracted by the destination extracting section 110.

In addition, in the present embodiment, the first document in the plural documents is defined as the reference document; however, the reference document is not limited to the first document. For example, when the second document in the five documents is defined as the reference document, the first and second documents are read (scanned) and the barcodes are extracted from the image data of the first and second documents. Since the barcode read from the image data of the second document is the reference destination information, first, the barcode extracted from the image data of the first document is compared with the barcode extracted from the image data of the second document. Then the barcodes on and after the third document are read, the read barcodes are compared with the barcode extracted from the image data of the second document, and it is determined whether the barcodes of the five documents are the same.

In addition, for example, when the fifth document (the last document) in the five documents is the reference document, first, the five documents are read and the barcodes of the five documents are extracted and the extracted five barcodes are temporarily stored in the memory unit 15. The stored barcodes are compared with the barcode of the fifth document and it is determined whether the five barcodes are the same.

In addition, in the present embodiment, the log information obtaining section 180 obtains the log information of the facsimile transmission. The obtained log information is stored in the log information storing section 220 of the auxiliary memory unit 14. Therefore, even if wrong facsimile transmission occurs, the image data, the destination, the transmitted date, and so on of the wrong transmission can be traced.

In addition, in the present embodiment, the destination information storing section 210 and the log information storing section 220 are in the auxiliary memory unit 14. However, the destination information storing section 210 and the log information storing section 220 can be in an external memory unit (not shown) connected to the data communication apparatus 100.

In addition, in the present embodiment, the barcode is extracted as the destination information. However, instead of using the barcode, a QR (quick response) code can be used as the destination information. Further, when a Fax number is described on a document, the Fax number can be extracted as the destination information of the document.

Second Embodiment

Next, referring to the drawings, a second embodiment of the present invention is described. In the second embodiment of the present invention, when an element is similar to or the same as that in the first embodiment of the present invention, the same reference number as that in the first embodiment is used for the element, and the same description as that in the first embodiment is omitted.

In the second embodiment of the present invention, a function for determining the number of documents is added to the first embodiment of the present invention.

Figure 7:
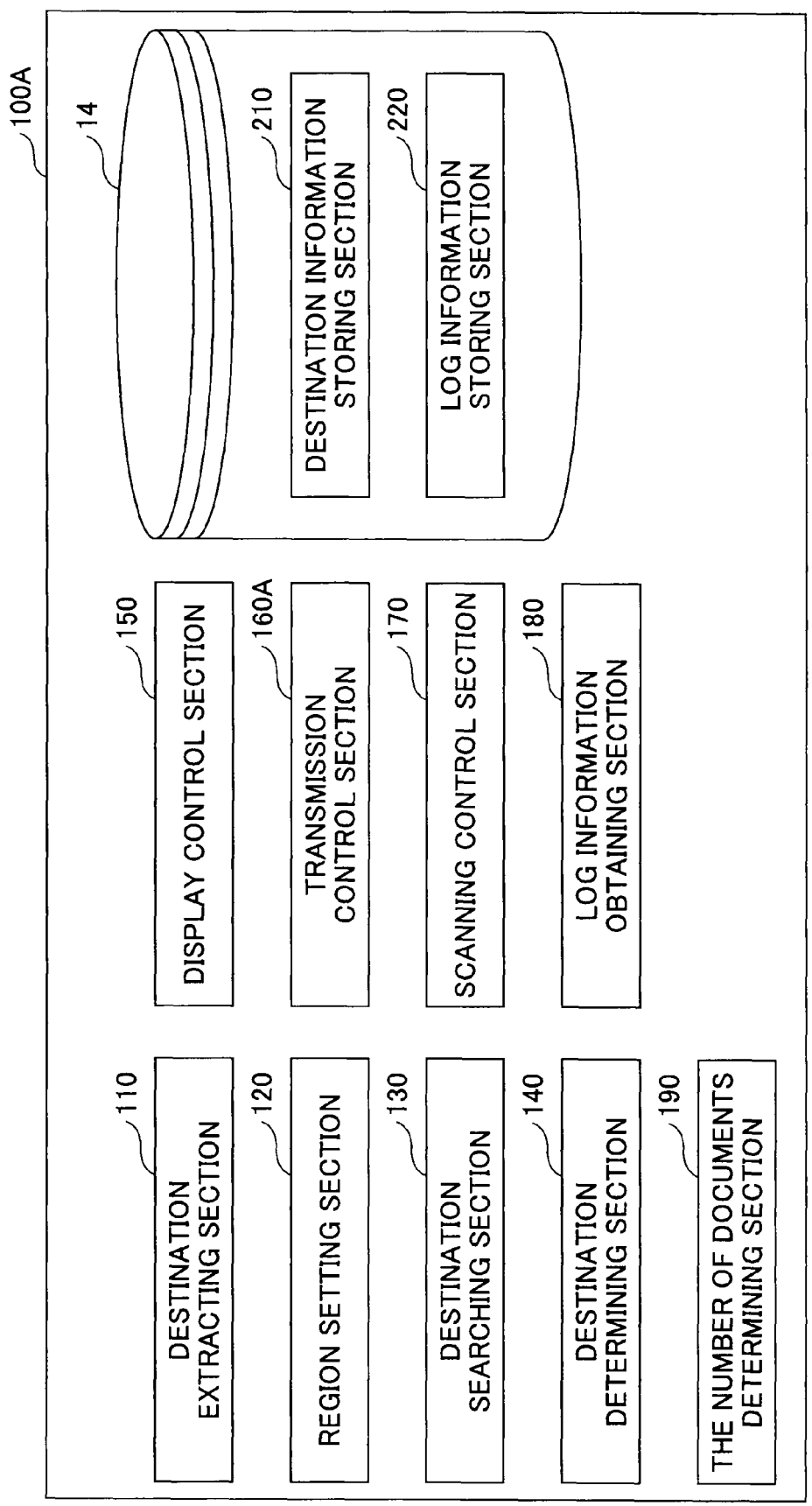
FIG. 7 is a functional structure of a data communication apparatus according to a second embodiment of the present invention.

FIG. 7 is a functional structure of a data communication apparatus 101A according to the second embodiment of the present invention.

As shown in FIG. 7, when the data communication apparatus 100A is compared with the data communication apparatus 100 shown in FIG. 2, the data communication apparatus 100A newly includes the number of documents determining section 190. In addition, the transmission control section 160 shown in FIG. 2 is changed to a transmission control section 160A.

The number of documents determining section 190 determines whether the number of documents scanned by the scanning unit 11 is the same as the number of documents input on the operating panel 18.

The transmission control section 160A controls the transmission of image data based on the determined results of the destination determining section 140 and the number of documents determining section 190. Specifically, when the number of documents determining section 190 determines that the number of documents scanned by the scanning unit 11 is the same as the number of documents input on the operating panel 18, and the destination determining section 140 determines that the reference destination information of the reference document is the same as the destination information of the documents other than the reference document; the transmission control section 160A transmits the image data of the documents.

Figure 8:
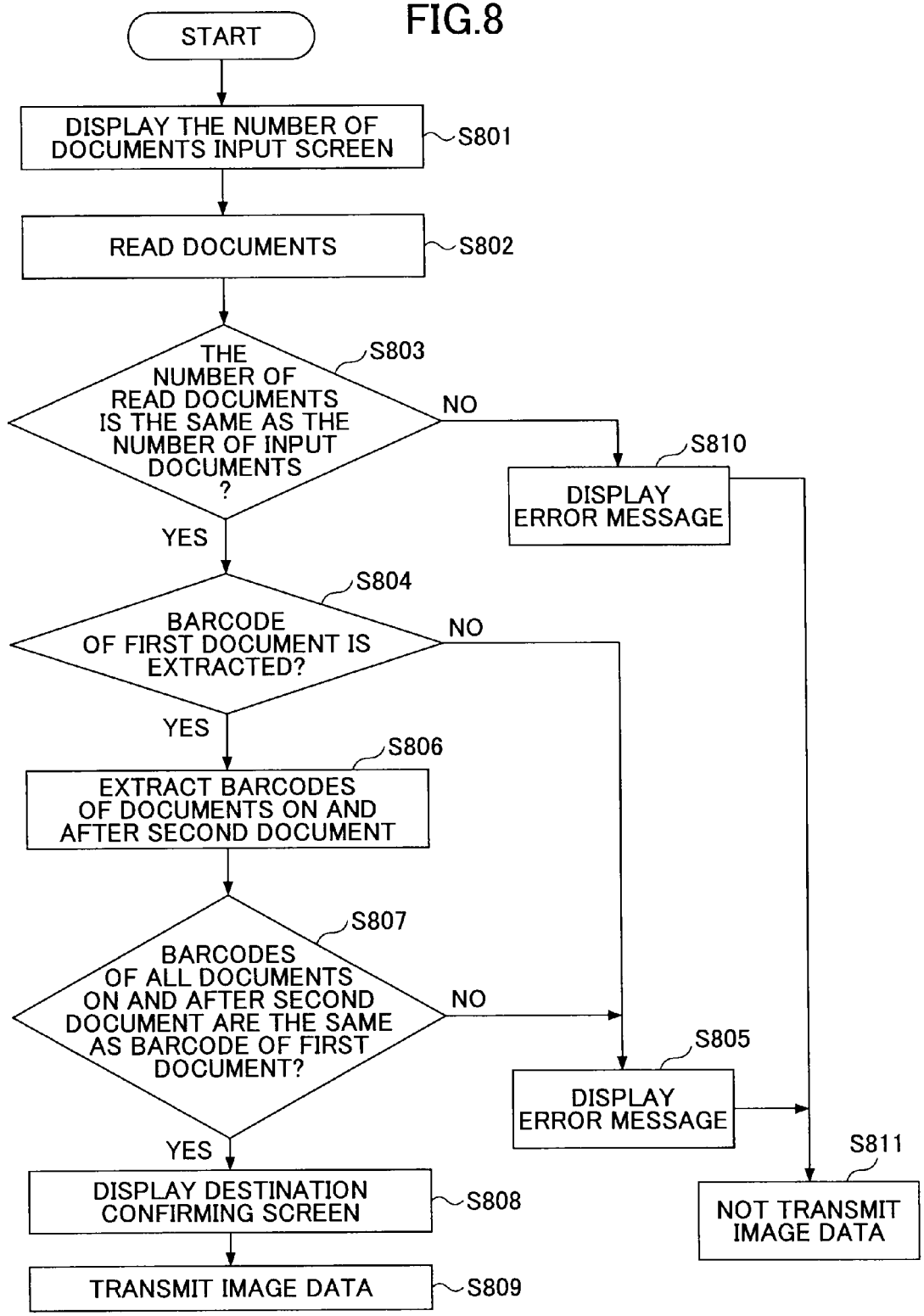
FIG. 8 is a flowchart showing processes by the data communication apparatus according to the second embodiment of the present invention.

Next, referring to FIG. 8, processes by the data communication apparatus 100A are described.

FIG. 8 is a flowchart showing processes by the data communication apparatus 100A.

First, when the data communication apparatus 100A receives an instruction from a user to transmit image data of documents by using a facsimile function to a destination, the data communication apparatus 100A causes the display control section 150 to display an input screen of the number of documents (the number of documents input screen) on the operating panel 18 (S801).

Figure 9:
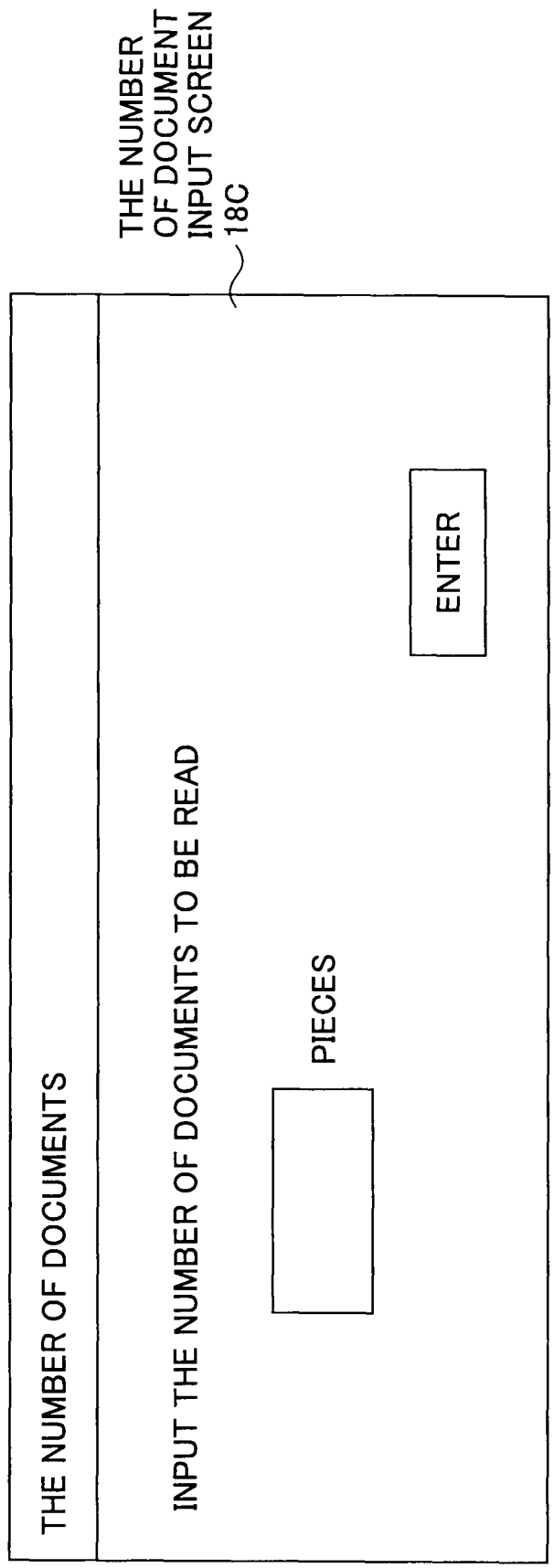
FIG. 9 is a diagram showing the number of documents input screen on the operating panel shown in FIG. 1.

FIG. 9 is a diagram showing the number of documents input screen 18C on the operating panel 18. The number of documents to be read (scanned) is input on the number of documents input screen 18C (the number of documents input unit).

When the data communication apparatus 100A has been set so that the number of documents determining section 190 determines the number of documents to be read, the number of documents input screen 18C is displayed on the operating panel 18.

Next, settings in the data communication apparatus 100A are described.

FIG. 10 is a diagram showing an example of a setting screen 18D on the operating panel 18.

In the data communication apparatus 100A, various settings with respect to, for example, facsimile transmission can be executed on the setting screen 18D.

On the setting screen 18D, for example, when "DETERMINATION OF THE NUMBER OF DOCUMENTS TO BE READ" is set in column 91, the number of documents determining section 190 determines the number of documents to be read. In addition, on the setting screen 18D, when "DETECTION OF MIX OF WRONG DOCUMENT" is set in column 92, the destination determining section 140 determines the destination information of the documents to be transmitted. When the destination determining section 140 determines the destination information of the documents to be transmitted, the destination determining process shown in FIG. 6 in the first embodiment of the present invention is executed by setting plural documents using, for example, an ADF (automatic document feeder). That is, when a wrong document is mixed into the plural documents, the wrong document can be detected as shown in FIG. 6.

In addition, on the setting screen 18D, when "DESTINATION INFORMATION SEARCH" is set in column 93, the destination searching section 130 searches for the destination information of the documents to be transmitted. That is, the processes shown in FIG. 3 in the first embodiment of the present invention can be executed.

Returning to FIG. 8, when the number of documents to be read is input on the number of documents input screen 18C shown in FIG. 9, the scanning unit 11 reads (scans) all the documents to be transmitted by the facsimile function (S802). Specifically, for example, when the data communication apparatus 100A uses an ADF, all the documents set on the ADF are read (scanned).

The number of documents determining section 190 determines whether the number of documents read (scanned) by the scanning unit 11 is the same as the number of documents input on the number of documents input screen 18C of the operating panel 18 (S803).

When the number of documents scanned by the scanning unit 11 is the same as the number of documents input on the number of documents input screen 18C on the operating panel 18 (YES in S803), the destination extracting section 110 extracts a barcode from image data of a first document (S804). When the destination extracting section 110 fails to extract a barcode from image data of a first document (NO in S804), the display control section 150 causes the operating panel 18 to display an error message that a document having no barcode is mixed into the documents (S805). Then the data communication apparatus 100A does not transmit the image data (S811).

When the destination extracting section 110 succeeds in extracting a barcode from image data of a first document (YES in S804), the destination extracting section 110 extracts barcodes of image data of documents on and after a second document (S806).

The destination determining section 140 determines whether the barcodes of all the documents on and after the second documents are the same as the barcode of the first document (S807). When the destination determining section 140 determines that the barcodes of all the documents on and after the second documents are not absolutely the same as the barcode of the first document (NO in S807), the display control section 150 causes the operating panel 18 to display an error message that a wrong document is mixed into the documents (S805). Then the data communication apparatus 101A does not transmit the image data (S811).

When the barcodes of all the documents on and after the second documents are the same as the barcode of the first document (YES in S807), the display control section 150 causes the operating panel 18 to display a destination confirming screen (S808). When the user confirms the screen and instructs transmitting the image data of the plural documents, the transmission control section 160A transmits the image data of the plural documents to the destination by using the facsimile function (S809).

When the number of documents scanned by the scanning unit 11 is not the same as the number of documents input on the number of documents input screen 18C of the operating panel 18 (NO in S803), the display control section 150 causes the operating panel 18 to display an error message that the numbers are not the same (S810). Then the data communication apparatus 100A does not transmit the image data (S811).

As described above, in the second embodiment of the present invention, it is determined whether the number of documents input on the number of documents input screen 18C is the same as the number of documents read by the scanning unit 11. Therefore, a lack of documents to be transmitted can be detected. For example, when the number of documents input on the number of documents input screen 18C is five and the number of documents read by the scanning unit 11 is four, it is detected that one document is lost. In addition, for example, when the number of documents input on the number of documents input screen 18C is five and the number of documents read by the scanning unit 11 is six, it is detected that one wrong document is mixed into the documents to be transmitted.

In addition, in the second embodiment of the present invention, the number of documents determining section 190 determines the number of documents to be transmitted and the destination determining section 140 determines the destination information of the documents to be transmitted. Therefore, the image data of the documents can be accurately transmitted to the right destination without lacking image data of a document to be transmitted and without mixing image data of a wrong document into the documents to be transmitted.

Further, the present invention is not limited to the specifically disclosed embodiments, and variations and modifications may be made without departing from the scope of the present invention.

The present invention is based on Japanese Priority Patent Application No. 2007-211080, filed on Aug. 13, 2007, with the Japanese Patent Office, the entire contents of which are hereby incorporated herein by reference.

What is claimed is:

1. A data communication apparatus, comprising:
a destination extracting unit which extracts destination information from image data;
a transmission unit which transmits the image data to a destination corresponding to the destination information; and
a transmission control unit which controls the transmission unit to transmit the image data of plural documents to the destination corresponding to the destination information which has been extracted from the image data of each of the plural documents, when all of the destination information which has been extracted from the image data of each of the plural documents is the same, and controls the transmission unit to not transmit the image data of any of the plural documents, when the all of the destination information which has been extracted from the image data of each of the plural documents is not the same.

2. The data communication apparatus as claimed in claim 1, further comprising:
a display control unit which displays a message when the all of the destination information which has been extracted from the image data of each of the plural documents by the destination extracting unit is not the same.

3. The data communication apparatus as claimed in claim 1, wherein:
the transmission control unit causes the transmission unit to transmit the image data of the plural documents to the destination corresponding to the destination information when a number of pages of documents input by a document input unit is identical to a number of pages of the plural documents, and
the transmission control unit stops the transmission unit from transmitting when the number of pages of the documents input by the input unit is not identical to the number of pages of the plural documents.

4. The data communication apparatus as claimed in claim 1, wherein the destination information is code information.

5. The data communication apparatus as claimed in claim 1, further comprising:
a scanner which scans the documents and generates the image data; and
a scanner controller which controls the scanner to perform scanning and obtains the image data of the plural documents,
wherein the transmission control unit controls a transmission of the image data of the plural documents obtained by the scanner.

6. A data communication method, comprising:
extracting destination information from image data of plural documents;
determining whether the destination information which has been extracted from the image data of the plural documents is the same; and
controlling transmission of the image data of the plural documents to a destination corresponding the destination information such that the transmission for each of the plural documents is permitted when all of the destination information which has been extracted from the image data of each of the plural documents is determined to be the same, and controls the transmission unit to not transmit the image data of any of the plural documents, when the all of the destination information which has been extracted from the image data of each of the plural documents is not the same.

7. The data communication method as claimed in claim 6, further comprising:
displaying a message indicating that the destination information is different, when the determining determines that the all of the destination information which has been extracted from the image data of each of the plural documents is not the same.

8. The data communication method as claimed in claim 6, wherein the controlling the transmission comprises:
transmitting the image data of the plural documents to the destination corresponding to the destination information when a number of pages of documents input is identical to a number of pages of the plural documents; and
stopping the transmitting when the number of pages of the documents input is not identical to the number of pages of the plural documents.

9. The data communication method as claimed in claim 6, wherein the destination information is code information.

10. The data communication method as claimed in claim 6, further comprising:
scanning the documents and generating the image data,
wherein the controlling of the transmission controls the transmission of the image data of the plural documents obtained by the scanning.

11. A non-transitory computer readable media including computer code for instructing a processor to perform the method of:
extracting destination information from image data of plural documents;

determining whether the destination information which has been extracted from the image data of the plural documents is the same; and controlling transmission of the image data of the plural documents to a destination corresponding the destination information such that the transmission for each of the plural documents is permitted when all of the destination information which has been extracted from the image data of each of the plural documents is determined to be the same, and controls the transmission unit to not transmit the image data of any of the plural documents, when the all of the destination information which has been extracted from the image data of each of the plural documents is not the same.

12. The non-transitory computer readable media as claimed in claim 11, wherein the method further comprises:

displaying a message indicating that the destination information is different, when the determining determines that the all of the destination information which has been extracted from the image data of each of the plural documents is not identical to each other.

13. The non-transitory computer readable media as claimed in claim 11, wherein the controlling the transmission comprises:

transmitting the image data of the plural documents to the destination corresponding to the destination information when a number of pages of documents input is identical to a number of pages of the plural documents; and stopping the transmitting when the number of pages of the documents input is not identical to the number of pages of the plural documents.

14. The non-transitory computer readable media as claimed in claim 11, wherein the destination information is code information.

15. The non-transitory computer readable media as claimed in claim 11, wherein the method further comprises:

scanning the documents and generating the image data, wherein the controlling of the transmission controls the transmission of the image data of the plural documents obtained by the scanning.

\* \* \* \* \*